No. 717,576. PATENTED JAN. 6, 1903.
C. HOLST.
BICYCLE GEARING.
APPLICATION FILED AUG. 3, 1901.
NO MODEL.
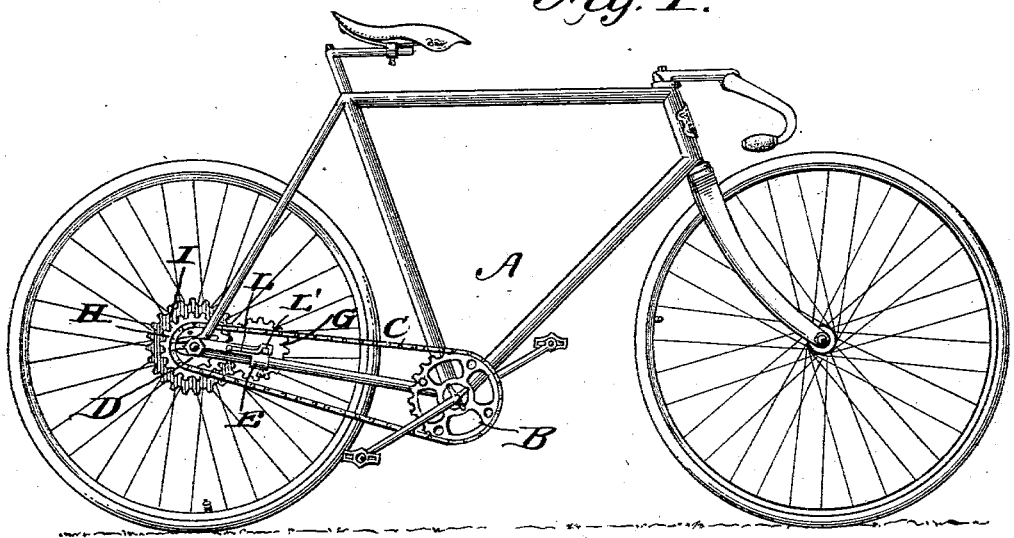
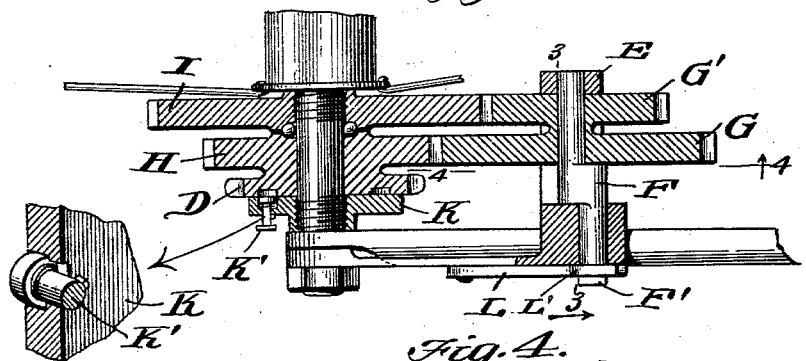
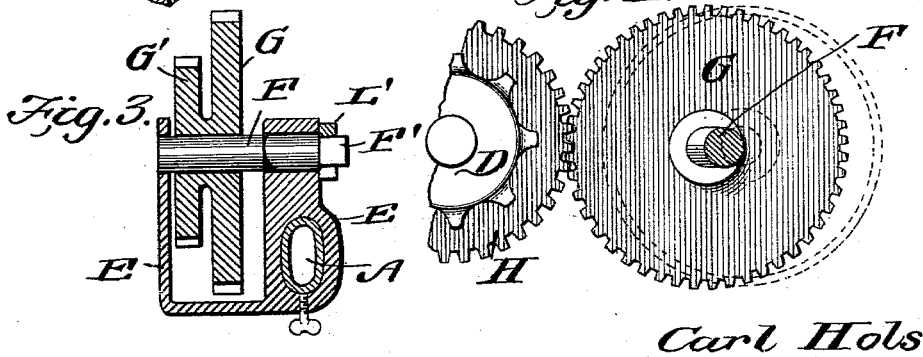
Inventor
Carl Holst.
Witnesses
By
Attorneys

UNITED STATES PATENT OFFICE.

CARL HOLST, OF BROOKLYN, NEW YORK.

BICYCLE-GEARING.

SPECIFICATION forming part of Letters Patent No. 717,576, dated January 6, 1903.

Application filed August 3, 1901. Serial No. 70,807. (No model.)

*To all whom it may concern:*

Be it known that I, CARL HOLST, a citizen of the United States, residing at Brooklyn, in the county of Kings and State of New York, have invented a new and useful Bicycle-Gearing, of which the following is a specification.

This invention is an improved construction of bicycle-gearing, the object being to provide a cheap and simple supplemental gearing which can be quickly and easily thrown into use whenever great power is required—as, for instance, when climbing a hill.

With this object in view the invention consists in the peculiar construction of the various parts and in their novel combination and arrangement, all of which will be fully described hereinafter and pointed out in the claims.

In the drawings forming a part of this specification, Figure 1 is a side elevation of a bicycle provided with my improved form of gearing. Fig. 2 is a horizontal sectional view of the supplemental gearing. Fig. 3 is a transverse section on the line 3 3 of Fig. 2, and Fig. 4 is a sectional elevation on the line 4 4 of Fig. 2.

Referring to the drawings, A indicates the bicycle, which is substantially the same as bicycles now in common use, having the drive-sprocket B, drive-chain C, and rear sprocket D. A U-shaped bracket E is rigidly secured to one member of the bicycle-frame adjacent to the rear sprocket, and journaled in the said bracket is a cranked shaft F, having a square end F'. Loosely mounted upon the shaft F is a compound gear comprising the large gear G and smaller gear G'. Integral with the rear sprocket D is a gear H, and rigidly mounted upon the rear axle is a gear I, which is larger in diameter than the gear H, and it will be noted that the gear H is smaller in diameter than the gear G. The sprocket D and gear H are loose upon the rear axle; but a disk K is rigidly mounted upon the said axle and carries a clutch-pin K', by means of which the sprocket and disk can be brought into engagement, so that they will move together.

L indicates a latch pivoted to the side of the frame member and having a raised end L', adapted to fit over the square end F" of the shaft F.

Now in operation we will assume that the bicycle is traveling upon level ground and therefore does not need the supplemental driving mechanism. In that case the shaft F is turned slightly, moving the gears G and G' away from the gears H and I. The disk K and the sprocket D are brought into engagement and the bicycle therefore operates as an ordinary bicycle, the power being applied directly to the rear axle through the medium of the sprocket. In case, however, great power is required—as, for instance, when climbing a hill—the shaft F is turned so as to bring the gears G and G' into mesh, and the disk K is thrown out of engagement with the sprocket by withdrawing the clutch-pin K'. The power will then be applied to the sprocket D, which operates the integral gear H, which in turn drives the gear G, and inasmuch as the gears G and G' are integral and the gear G' in mesh with the gear I it will be seen that the power is applied to the rear axle of the said gear I, which in turn is operated by the gear G'. This results in a decrease in speed and a corresponding increase in power.

It will thus be seen that I provide an exceedingly simple, cheap, and efficient supplemental gear for bicycles, by means of which sufficient power can be obtained for the purpose of climbing almost any hill.

Having thus fully described my invention, what I claim as new, and desire to secure by Letters Patent of the United States, is—

1. In a supplemental gear for bicycles, the combination with the bracket, of the cranked shaft journaled therein and having a square outer end, the compound gear loosely mounted upon the said shaft, a sprocket loose upon the rear axle and having a gear integral therewith, a gear fast upon the rear axle, a disk fast upon the rear axle and having a clutch-pin adapted to engage the sprocket for the purpose of rigidly connecting the disk and sprocket, and a latch adapted to engage the square end of the crank-shaft for the purpose of locking the same in position, substantially as shown and described.

2. In a bicycle-gearing the combination with the front and rear sprockets and operating means connecting the two, said rear sprocket being loosely mounted upon the rear axle, of a bracket fixed to the rear fork of the bicycle, having an arm secured to the axle-nut, an eccentric shaft having a squared projecting end mounted in said bracket, a latch pivoted on said bracket and engaging the squared end of said shaft, a compound gear mounted loosely upon said eccentric shaft, a gear integral with said rear sprocket, coöperating with one of the compound gears when said gears are brought into proximity by the rotation of said eccentric shaft, another gear independent of said sprocket and integral gear, secured to said rear shaft and to the rear wheel, coöperating with one of the compound gears when brought into proximity by the rotation of said eccentric shaft and a disk secured to the rear shaft carrying a sliding bolt for locking the loose sprocket to the shaft when said compound gear is not in engagement with the gears in the rear axle, substantially as described.

CARL HOLST.

Witnesses:
FRANK LUNDGREN,
EUGENE CONRAN.